(12) United States Patent
Sasaki et al.

(10) Patent No.: US 9,036,234 B2
(45) Date of Patent: May 19, 2015

(54) HEAD-UP DISPLAY DEVICE FOR VEHICLE

(71) Applicant: DENSO CORPORATION, Kariya, Aichi-pref. (JP)

(72) Inventors: Tatsuya Sasaki, Chiryu (JP); Hideyuki Nakane, Nishio (JP)

(73) Assignee: DENSO CORPORATION, Kariya (JP)

( * ) Notice: Subject to any disclaimer, the term of this patent is extended or adjusted under 35 U.S.C. 154(b) by 156 days.

(21) Appl. No.: 13/756,899

(22) Filed: Feb. 1, 2013

(65) Prior Publication Data

US 2013/0201540 A1 Aug. 8, 2013

(30) Foreign Application Priority Data

Feb. 8, 2012 (JP) .................................. 2012-025461

(51) Int. Cl.
  *G02B 26/08* (2006.01)
  *G03H 1/00* (2006.01)
  *G02B 27/14* (2006.01)
  *H02K 21/12* (2006.01)
  (Continued)

(52) U.S. Cl.
  CPC ........ *G02B 27/0101* (2013.01); *G02B 27/0149* (2013.01)

(58) Field of Classification Search
  CPC ............. G02B 27/0103; G02B 26/004; G02B 27/0172; G02B 27/0149; G02B 27/01; G03B 21/00; G03B 21/14; G01C 21/22; B60K 35/00; G09F 19/18; H02K 21/24; H02K 21/12; H02K 15/02
  USPC ......... 359/221.3, 630–634, 13–14; 310/49 R, 310/156.32, 156.33, 156.34, 266–268, 310/156.35, 156.36, 156.02; 353/11–12, 353/28, 119; 340/438, 980, 995.1, 815.47, 340/815.74; 349/11; 348/115
  See application file for complete search history.

(56) References Cited

U.S. PATENT DOCUMENTS

| 2011/0061482 A1 | 3/2011 | Maruyama et al. |
| 2011/0134498 A1 | 6/2011 | Ohta et al. |

(Continued)

FOREIGN PATENT DOCUMENTS

| JP | 6-324248 | 11/1994 |
| JP | 09-163798 | 6/1997 |

(Continued)

OTHER PUBLICATIONS

Office action dated Mar. 3, 2014 in corresponding Korean Application No. 10-2013-11901.

(Continued)

*Primary Examiner* — Dawayne A Pinkney
(74) *Attorney, Agent, or Firm* — Harness, Dickey & Pierce, PLC

(57) ABSTRACT

A HUD device includes a stepper motor, which rotates a reflection mirror for adjusting a display position of a virtual image. The stepper motor has an electric stabilization point and a mechanical stabilization point. A control system controls a drive signal for the stepper motor in response to an adjustment instruction. Pole teeth of a specified phase, which provides a greater magnetic attraction force with the rotor when not powered than by pole teeth of other phase, is set as stabilization pole teeth. The control system continues to apply the drive signal until the target stabilization point is attained even after the adjustment instruction is stopped. The target stabilization point is set to the electric stabilization point, at which the holding torque is provided by the stabilization pole teeth of the specified phase.

6 Claims, 7 Drawing Sheets

(51) Int. Cl.
*G03B 21/26* (2006.01)
*G02F 1/1335* (2006.01)
*H04N 7/00* (2011.01)
*G08B 5/36* (2006.01)
*G02B 27/01* (2006.01)

(56) References Cited

U.S. PATENT DOCUMENTS

2011/0193508 A1   8/2011   Oomori
2011/0241596 A1   10/2011  Sasaki et al.

FOREIGN PATENT DOCUMENTS

| JP | 09-238497 | 9/1997 |
|---|---|---|
| JP | 2005-012947 | 1/2005 |
| JP | 2009-050057 | 3/2009 |
| JP | 2011-207431 | 10/2011 |
| JP | 2012-023806 | 2/2012 |

OTHER PUBLICATIONS

Office action dated Mar. 3, 2014 in corresponding Korean Application No. 10-2013-11904.

Sasaki, et al, U.S. Appl. No. 13/756,949, filed Feb. 1, 2013, "Head-Up Display Device for Vehicle".

Office Action dated Sep. 8, 2014 in the related U.S. Appl. No. 13/756,949.

Office Action dated Sep. 29, 2014 in related Chinese application No. 201310041308.6 with English translation.

Office Action issued Oct. 10, 2014 in corresponding CN Application No. 201310042817.0 (with English translation).

HEAD-UP DISPLAY DEVICE FOR VEHICLE

CROSS REFERENCE TO RELATED APPLICATION

This application is based on and incorporates herein by reference Japanese patent application No. 2012-25461 filed on Feb. 8, 2012.

TECHNICAL FIELD

The present disclosure relates to a head-up display device for a vehicle.

BACKGROUND

In a conventional head-up display (HUD) device for a vehicle, a light-emitted image such as vehicle information, which is displayed by a display unit, is projected onto a projection target such as a windshield of a vehicle so that the displayed image may be displayed as a virtual image. JP 2011-207431A (US 2001/0241596 A1) discloses one example of such a HUD device, in which a display image provided by a display unit is reflected by a reflection mirror such as a concave mirror and projected onto a projection target. By using the reflection mirror, the HUD device can be mounted in a limited space in a vehicle.

In this HUD device, a stepper motor is used to rotate the reflection mirror in response to a drive signal corresponding to an adjustment instruction from an external side so that a display position of virtual image may be adjusted. According to this configuration, a passenger (driver) in a vehicle is enabled to adjust a position of a virtual image of vehicle information to a position, which is more readily viewable, by inputting a position adjustment instruction to the HUD device.

In addition, in the HUD device, the stepper motor is continued to be driven by the drive signal until it is stabilized electrically, when the input of the adjustment instruction is stopped. If the drive signal is stopped at a point, which is not at the electric stabilization point, the stepper motor tends to step out of phase in response to an impact of external force or vibration. The drive signal is continued to be applied for a while to avoid this out-of-phase problem.

In the HUD device, it is assumed that plural electric stabilization points, at which the stepper motor is electrically stabilized by holding torque generated when powered, and plural mechanical stabilization points, at which the stepper motor is mechanically stabilized by detent torque provided when not powered, match each other. Under this assumption, the stepper motor is stabilized by continuously applying the drive signal until the electric stabilization point is attained, even when the drive signal is stopped after the electric stabilization point. In this case, the stepper motor is assumed to be stabilized by the detent torque generated at the electric stabilization point.

In actual products, however, the electric stabilization points and the mechanical stabilization points are different in phase due to manufacturing tolerance and the like. As a result, in a case that the drive signal is continued to be applied at the electric stabilization point and thereafter stopped, the stepper motor temporarily stops and then starts rotation toward the mechanical stabilization point. This causes the display position of the virtual image to move again after being stopped once. Passengers in the vehicle will thus feel discomfort and even unreliability of the vehicle information displayed as the virtual image.

SUMMARY

It is an object therefore to provide a head-up display device for a vehicle, which increases reliability of a virtual image display of vehicle information.

According to one aspect, a head-up display device includes a display unit, an optical system, a stepper motor and a control system. The display unit displays a light-emitted image of vehicle information. The optical system includes a reflection mirror, which is provided rotatably to reflect the light-emitted image and project a reflected image toward a projection target so that a virtual image of the light-emitted image is displayed. The stepper motor drives, when powered by a drive signal, the reflection mirror to rotate for adjusting a display position of the virtual image. The stepper motor has plural electric stabilization points, at which a motor operation is electrically stabilized by a holding torque generated when powered, and plural mechanical stabilization points, at which the motor operation is stabilized by a detent torque generated when not powered. The control system controls the drive signal for the stepper motor in response to an adjustment instruction inputted from an external side.

The stepper motor has stators of plural phases, between which pole teeth are shifted in position in a motor rotation direction, and a rotor, which is rotated to a position in correspondence to magnetic attraction force generated relative to the pole teeth. The pole teeth of a specified phase of the plural phases are set as stabilization pole teeth, the magnetic attraction force of which generated when not powered provides the detent torque greater than that of another phase of the plural phases. The control system is configured to continue to apply the drive signal even after the adjustment instruction is stopped until an electric angle of the stepper motor reaches a target stabilization point, which is set to the electric stabilization point where the magnetic attraction force for providing the holding torque when powered is generated between the stabilization pole teeth and the rotor.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE EMBODIMENT (Configuration)

Figure 1:
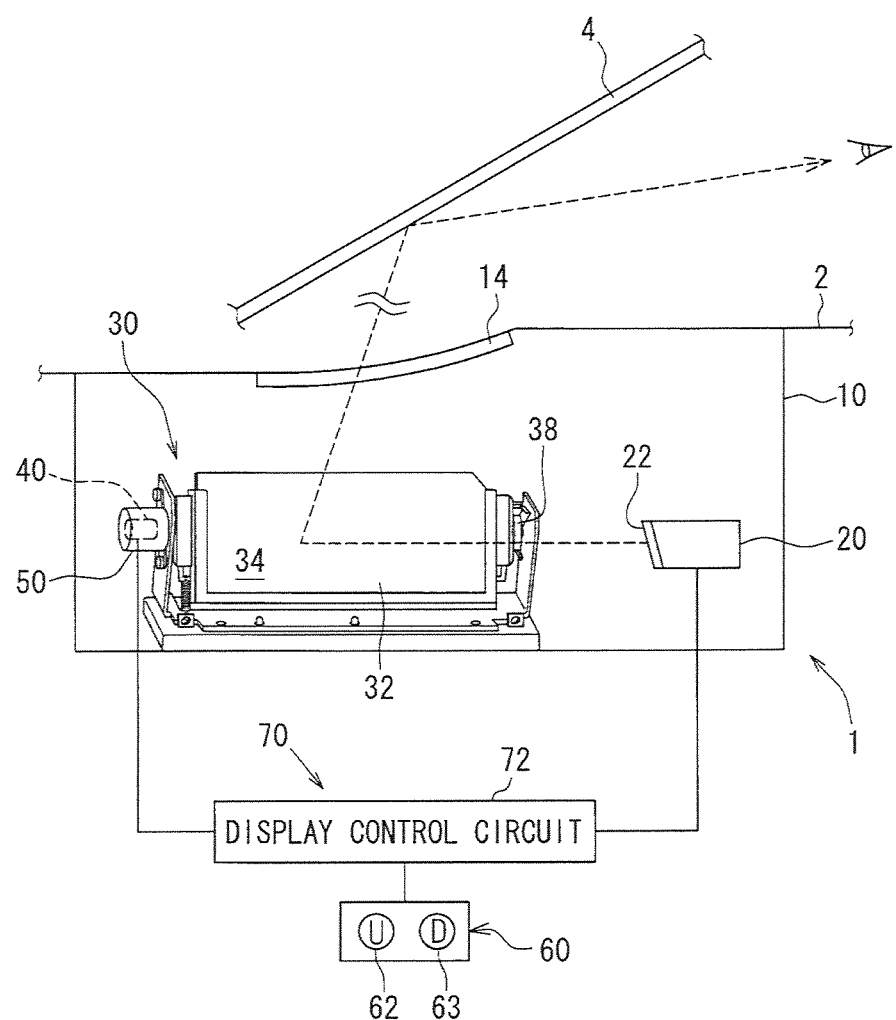
FIG. 1 is a schematic view of a head-up display (HUD) device for a vehicle according to one embodiment.

Referring first to FIG. 1, a head-up display (HUD) device 1 for a vehicle includes a housing 10, a display unit 20, an optical system 30, a stepper motor 40, a reduction gear mechanism 50, an adjustment switch 60 and a control system 70.

The housing 10 is formed in a hollow shape, which accommodates the other devices 20, 30, 40, 50 and the like of the HUD device 1, and mounted in an instrument panel 2 of a vehicle. The housing 10 has a translucent light projection window 14 at a position facing a windshield 4, which is fixed to a front side of a driver's seat of the vehicle as a projection target, in an up-down direction.

Figure 2:
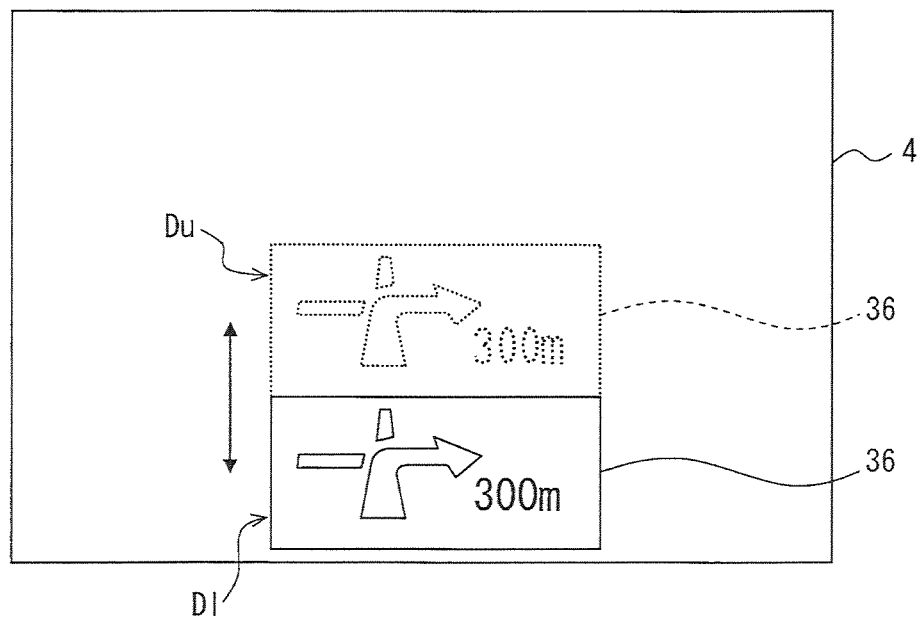
FIG. 2 is a schematic view of a virtual image displayed by the HUD device shown in FIG. 1.

The display unit 20 is a trans-illumination type liquid crystal panel (LCD) and has a screen 22 for displaying an image. The display unit 20 emits light of a display image of the screen 22 by illuminating the screen 22 by a built-in backlight (not shown). The light image displayed by the display unit 20 is for providing vehicle information related to vehicle driving or vehicle conditions. The light image provides, for example, navigation information such as a vehicle travel direction or the like (for example, FIG. 2). The display image of the display unit 20 may be a physical quantity data, which includes a vehicle speed, a residual fuel quantity, a coolant temperature or the like, and vehicle exterior condition information, which includes a traffic condition, a safety condition or the like, other than the navigation information.

The optical system 30 includes a number of optical parts including a reflection mirror 32 (other parts are not shown in FIG. 1), and projects the display image of the display unit 20 to the projection window 14. The reflection mirror 32 is formed of a concave mirror having a smooth reflection surface 34, which is curved in a concave shape. The reflection mirror 32 expands and reflects toward the projection window 14 side the display image, which is directly or indirectly incident as an optical image from the display unit 20 to the reflection surface 34. The reflection image of the reflection mirror 32 is projected to the windshield 4 through the projection window 14 and is image-formed at a forward side of the windshield 4. As a result, the vehicle information indicated by the display image of the display unit 20 is displayed at a driver's seat side in the vehicle as a virtual image 36 exemplarily shown in FIG. 2.

The reflection mirror 32 has a rotary shaft 38 supported rotatably in the housing 10. When the rotary shaft 38 is driven to rotate, the reflection mirror 32 moves a display position of the virtual image 36 in the up-down direction relative to the windshield 4 as exemplified in FIG. 2. The display of the virtual image 36 is realized between a lower limit display position Dl shown by solid lines in FIG. 2 and an upper limit display position Du shown by dotted lines in FIG. 2 in correspondence to optical characteristics of the optical system 30 and the windshield 4.

Figure 3:
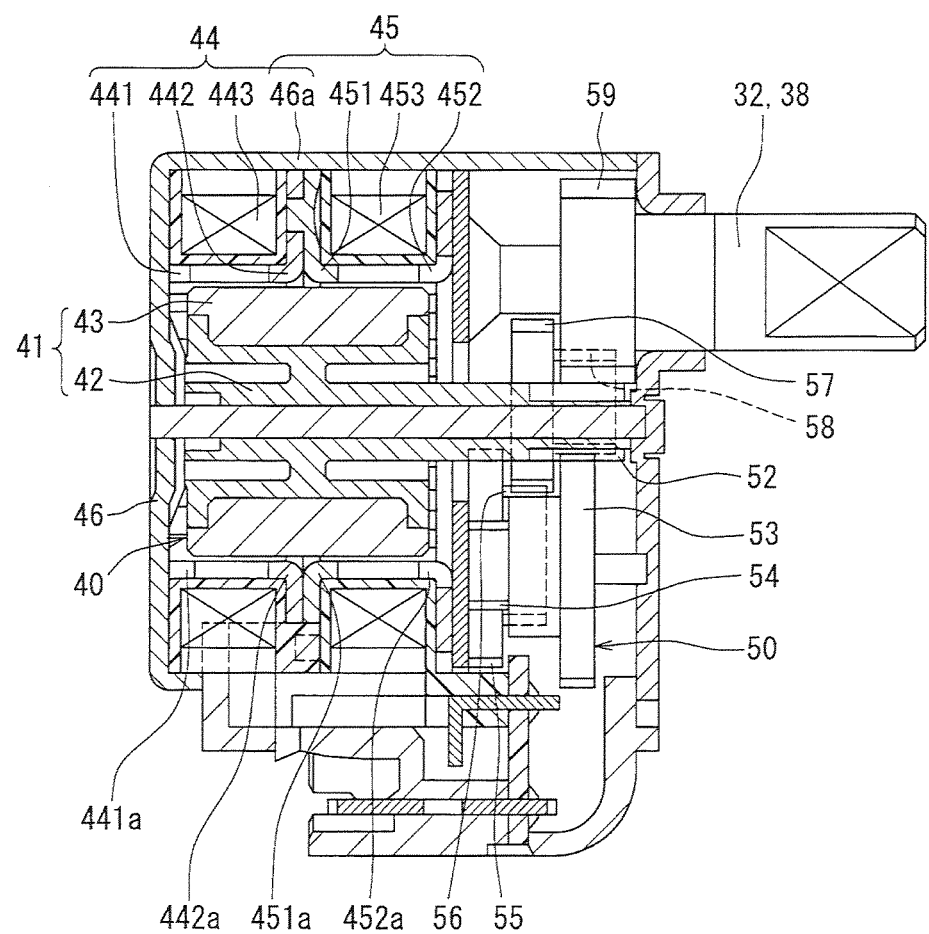
FIG. 3 is a sectional view of a stepper motor shown in FIG. 1 and a reduction gear.

As shown in FIG. 3, the stepper motor 40 is a claw-pole permanent magnet type and has a magnetic casing 46, a rotor 41 and stators 44, 45. The magnetic casing 46 is formed of magnetic material and in a hollow shape. The rotor 41 is formed of a motor shaft 42 and rotor magnets 43 attached to the outer peripheral surface of the motor shaft 42. The motor shaft 42 is supported rotatably by the magnetic casing 46. The rotor magnets 43 are permanent magnets and are arranged to provide magnetic poles N and S alternately in a circumferential direction (rotation direction) of the rotor 41.

Figure 4:
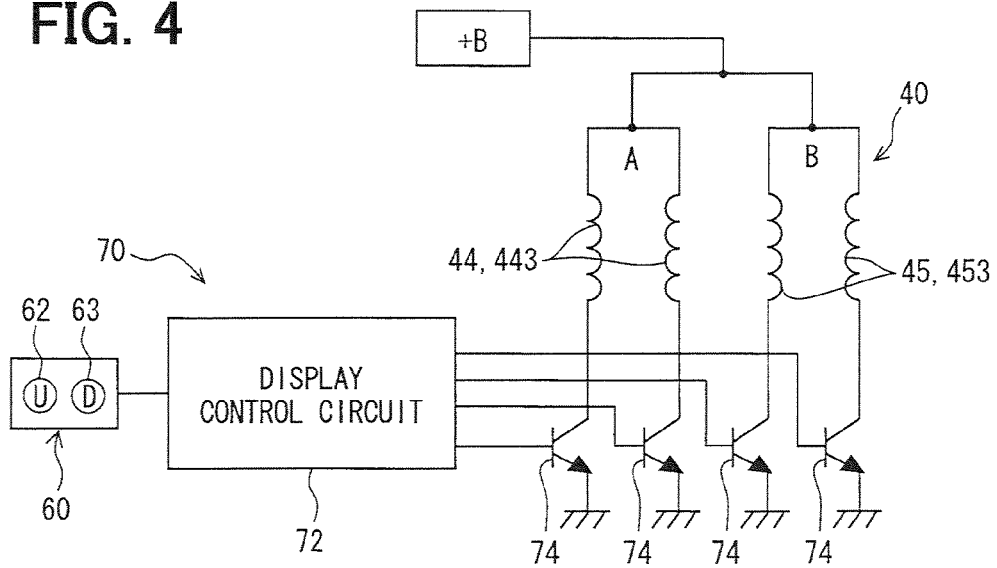
FIG. 4 is a block diagram of electric connection between the stepper motor shown in FIG. 1 and a control system therefor.
Figure 5:
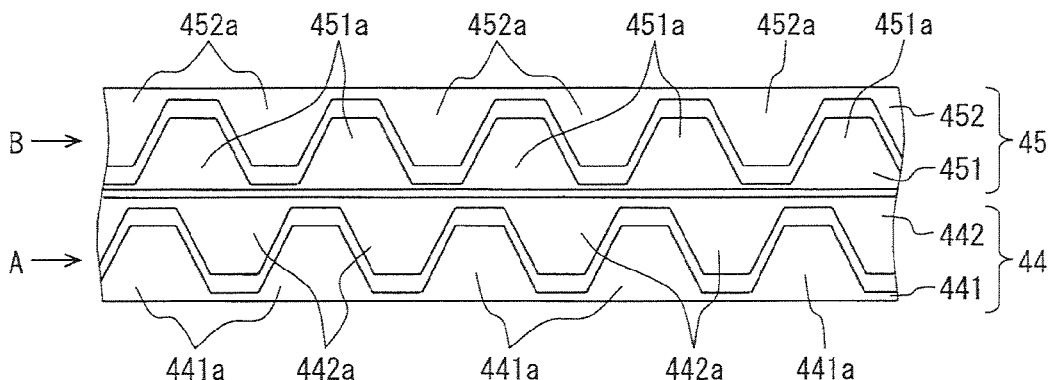
FIG. 5 is a schematic view of a stator shown in FIG. 3, which is expanded in plane in a rotation direction of a rotor.

The stators 44 and 45 are provided for two phases and firmly fixed to the magnetic casing 46 at a radially outside part relative to the rotor 41. As shown in FIG. 3 and FIG. 4, the stator 44 for one phase (A-phase) has magnetic yokes 441, 442 and a coil 443, and the stator 45 for the other phase (B-phase) has magnetic yokes 451, 452 and a coil 453. The magnetic yokes 441, 442, 451, 452 are formed of magnetic material in an annular shape and have a plurality of nail-shaped pole teeth (claw poles) 441a, 442a, 451a, 452a, respectively, as shown in FIG. 5 in the expanded manner. The pole teeth 441a, 442a of the magnetic yokes 441, 442 for the A-phase are interleaved to be alternately arranged in the circumferential or rotation direction of the rotor 41. Similarly, the pole teeth 451a, 452a of the magnetic yokes 451, 452 for the B-phase are interleaved to be alternately arranged in the circumferential or rotation direction of the rotor 41. The magnetic yokes 441, 442, 451, 452 are arranged such that the pole teeth 441a, 451a, 442a, 452a are shifted by 1/2 pitch each other in this order in the rotation direction of the rotor 41.

As shown in FIG. 3, the phase coil 443 is arranged coaxially with the magnetic yokes 441, 442 for the A-phase, and the phase coil 453 is arranged coaxially with the magnetic yokes 451, 452 for the B-phase. The coil 443 and the phase coil 453 are shifted from each in position in the axial direction. In the stepper motor 40 configured as described above, when the phase coil 443 of the A-phase and the phase coil 453 of the B-phase are energized by being powered by drive signals, respectively, the rotor magnets 43 and the motor shaft 42 are rotated.

The reduction gear mechanism 50 has plural gears 52 to 59 meshed in series in the magnetic casing 46. The gear 52 of the first stage is provided on the motor shaft 42 and the gear 59 of the last stage is provided on the rotary shaft 38 of the reflection mirror 32. Thus the rotary motion of the motor shaft 42 is reduced in accordance with gear ratios among the gears 52 to 59 and transferred to the rotary shaft 38 so that the reflection mirror 32 is driven to rotate. When the stepper motor 40 rotates in the normal rotation direction, the reflection mirror 32 is driven to rotate in the normal rotation direction so that the display position of the virtual image 36 is shifted upward, for example. When the stepper motor 40 rotates in the reverse rotation direction, the reflection mirror 32 is driven to rotate in the reverse rotation direction so that the display position of the virtual image 36 is shifted downward, for example.

The adjustment switch 60 shown in FIG. 1 and FIG. 4 is provided to be operable by the passenger on the driver's seat in the vehicle. The adjustment switch 60 has, for example, two push-type operation members 62 and 63 so that the passenger may selectively input an upward adjustment instruction for moving the display position of the virtual image 36 upward and a downward adjustment instruction for moving the display position of the virtual image 36 downward, respectively. The adjustment switch 60 is thus configured to output different instruction signals, one for instructing the upward adjustment and the other for instructing the downward adjustment.

The control system 70 includes a display control circuit 72 and plural switching elements 74 and is provided inside or outside the housing 10. The display control circuit 72 is an electronic circuit including a microcomputer as a main part and electrically connected to the display unit 20 and the adjustment switch 60. As shown in FIG. 4, each switching element 74 is a transistor, the collector of which is electrically connected to the phase coil 443 or 453. The emitter and the base of each switching element 74 are connected electrically to a grounding terminal (not shown) and the display control circuit 72. The switching element 74 varies amplitude of the drive signal applied to the phase coil 443 of the A-phase or the phase coil 453 of the B-phase in response to base signals inputted from the display control circuit 72. Thus, by controlling the base signal for the switching element 74 by the display control circuit 72, the drive signal applied to the phase coil 443 or 453 is controlled.

In the control system 70 configured as described above, the display control circuit 72 controls the image display of the display unit 20. The display control circuit 72 further controls the drive signals applied to the phase coils 443 and 453 in response to the instruction signals inputted from the adjustment switch 60. Specifically, the display control circuit 72 controls electric angles of the drive signals applied to the phase coils 443 and 453 to electric angles for driving the reflection mirror 32 in the normal rotation direction in response to the upward adjustment instruction generated by the operation member 62 so that the display position of the virtual image 36 is moved upward. Further, the display control circuit 72 controls electric angles of the drive signals applied to the phase coils 443 and 453 to electric angles for driving the reflection mirror 32 in the reverse rotation direction in response to the downward adjustment instruction generated by the operation member 63 so that the display position of the virtual image 36 is moved downward.

Figure 6:
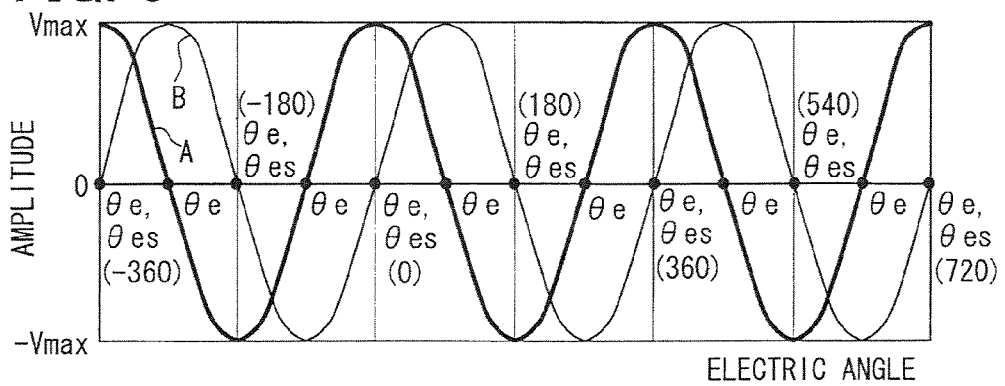
FIG. 6 is a characteristic diagram of a drive signal applied to the stepper motor shown in FIG. 1.

According to the HUD device 1 configured as described above, the voltage amplitudes of the drive signals, which are applied to the phase coils 443 and 453 of the A-phase and the B-phase to supply electric power to the stepper motor 40, are controlled to vary corresponding to the electric angles, respectively, for energizing the rotors 44 and 45 in two different phases. The drive signals for the phase coils 443 and 453 are controlled to be a maximum amplitude (Vmax, −Vmax) or a minimum amplitude (0) at every electric stabilization point (angle) θe, at which a holding torque for holding the motor shaft 42 is generated when the power is supplied. As exemplified in FIG. 6, the electric stabilization point ideally appears at every fixed angular interval of 90 degrees. However, the pole teeth 441a, 442a, 451a and 452a have tolerable differences in shape, position and the like thereamong. As a result, the actual interval between the electric stabilization points becomes longer or shorter than 90 degrees as exemplified in FIG. 7.

When no drive signal is applied to the phase coils 443 and 453, that is, in the non-energization period, plural mechanical stabilization points θm, at which a detent torque for holding the motor shaft 42 is generated, appear. The mechanical stabilization point θm is identical with the electric stabilization point θe ideally. However, as schematically exemplified in FIG. 7, it is likely in actual motor products that the mechanical stabilization point θm appears at a point, which is deviated from the electric stabilization point θe in phase in the rotation direction of the rotor 41. This deviation results from a difference in magnetic attraction forces, which are generated relative to the rotor magnets 43 when the motor is not energized by the pole teeth (pole teeth 441a and 442a in the example of FIG. 7) at the electric stabilization point θe in the energization phase and by the pole teeth (pole teeth 451a and 452a in the example of FIG. 7) adjacent to the pole teeth in the energization phase in the rotation direction.

Figure 8:
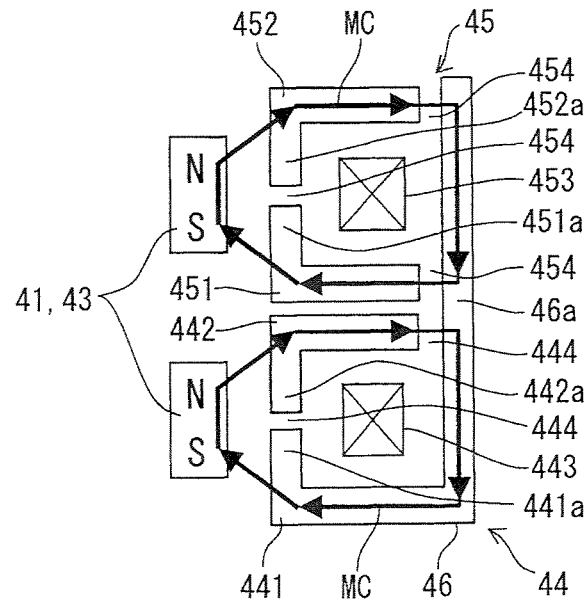
FIG. 8 is a schematic diagram of a characteristic of the stepper motor shown in FIG. 1.

As shown in FIG. 3 and FIG. 8, the stator 44 of the A-phase is formed of the magnetic yoke 441 and the magnetic yoke 442, which are combined with narrow air gaps 444. The magnetic yoke 441 is formed of magnetic material integrally with the cylindrical part 46a of the magnetic casing 46 and has the pole teeth 441a. The magnetic yoke 442 has the pole teeth 442a. On the other hand, the stator 45 of the B-phase is formed of the magnetic yoke 451, the magnetic yoke 452 and the cylindrical part 46a of the magnetic casing 46, which are combined with narrow air gaps 454. The magnetic yoke 451 has the pole teeth 451a. The magnetic yoke 452 has the pole teeth 452a. With this difference in configuration between the A-phase and the B-phase as shown in FIG. 8, the air gaps 454 are provided between the cylindrical part 46a and the yokes 451, 452 in the stator 45 of the B-phase, but only one air gap 444 is provided between the cylindrical part 46a and the yoke 442 in the stator 44 of the A-phase. Thus, the number of air gaps 444 and 445, through which magnetic circuits MC (FIG. 8) formed with the rotor magnet 43 pass when each phase coil 443, 453 is not powered (not energized), differ between the stators 44 and 45. As a result, the magnetic attraction forces between the rotor magnet 43 and the stator 44 and between the rotor magnet 43 and the stator 45 differ. The magnetic attraction force of pole teeth 441a, 442a of the A-phase stator 44, which is generated relative to the rotor magnet 43 at the time of non-energization to provide the detent torque, is greater than that of the pole teeth 451a, 452a of the B-phase stator 45. For this reason, the pole teeth 441a, 442a of the A-phase stator 44 are defined as stabilization pole teeth 441a, 442a. It is noted that FIG. 8 shows, for simplification and easy understanding, two different states, in one of which the pole teeth 441a and 442a of the A-phase face normally the magnetic poles N, S of the rotor magnet 43, and in the other of which the pole teeth 451a and 452a of the B-phase face normally the magnetic poles N, S of the rotor magnet 43.

Figure 9:
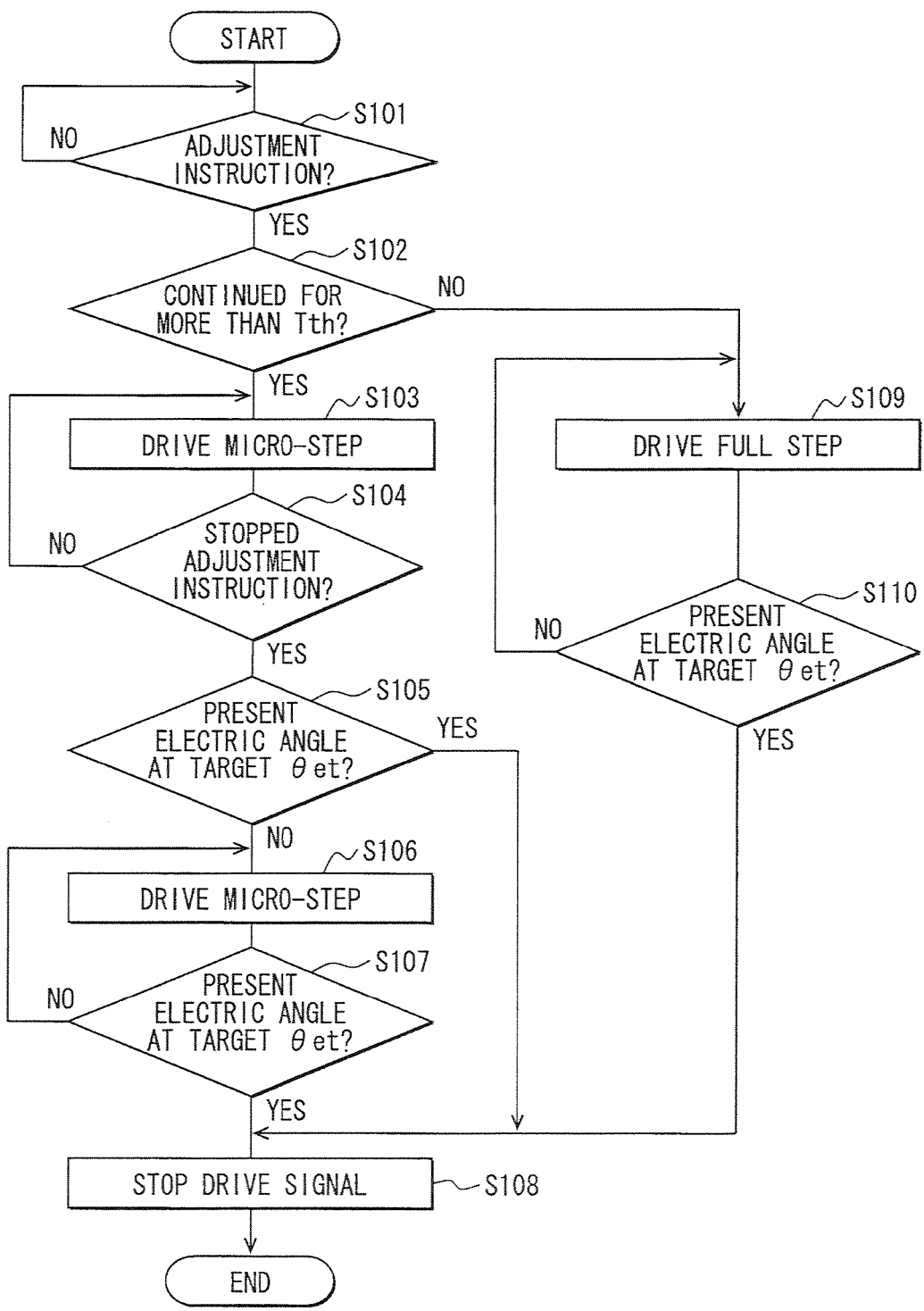
FIG. 9 is a flowchart of drive signal control processing executed by a display control circuit of the control system shown in FIG. 4.

For the stepper motor 40 having the electric stabilization point θe and the mechanical stabilization point θm, the display control circuit 72 controls the drive signals applied to the phase coils 443 and 453 in response to the instruction signal inputted from the adjustment switch 60 so that the display position of the virtual image 36 is adjusted. The display control circuit 72 is therefore configured to perform drive signal control processing based on a computer program as shown in a flowchart of FIG. 9. The drive signal control processing shown in FIG. 9 is started and finished, when an engine switch of the vehicle is turned on and off, respectively.

At S101 in the drive signal control processing, it is checked whether the instruction signal indicating the upward or downward adjustment instruction is inputted from the adjustment switch 60. If no instruction signal is inputted (S101: NO), S101 is repeated and no drive signal is applied to any of the phase coils 443 and 453. If the instruction signal of either instruction is applied (S101: YES), S102 is executed.

At S102 following the upward adjustment instruction or the downward adjustment instruction, it is checked whether the operation member 62 or 63 corresponding to the inputted adjustment instruction is continuously operated for more than a threshold time period Tth based on the instruction signal inputted from the adjustment switch 60. The threshold time period Tth is set to, for example, about 0.5 seconds or other time periods, so that the passenger will not feel bored or uneasy because of a long period from the start of manipulation on the adjustment switch 60 to the actual change in the display position of the virtual image 36.

Figure 10A:
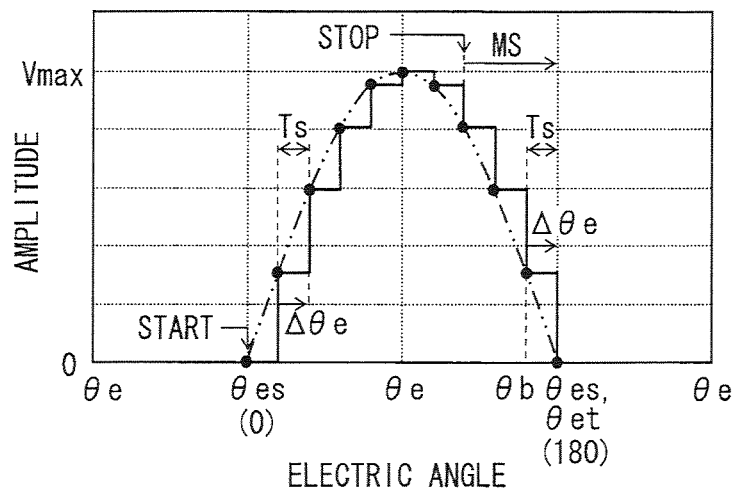
FIGS. 10A and 10B are characteristic diagrams of drive signals applied to the stepper motor shown in FIG. 1.

If the instruction signal indicating the operation of the operation member 62 or 63 is long and continued for more than the threshold time period Tth (S102: YES), it is determined that the instruction of the upward adjustment or the downward adjustment indicates a continuous adjustment of the display position of the virtual image 36. In this case, S103 is executed following S102. At S103, the drive signal applied to the phase coil 443, 453 is controlled as shown in FIG. 10A, so that the stepper motor 40 is driven to make a micro-step rotation. That is, the drive signal is changed continuously for a predetermined period Ts in the upward or the downward direction, from the present electric angle to the next electric angle, which is different by a step angle $\Delta\theta e$ for a micro-step driving. The step angle $\Delta\theta e$ in the micro-step driving is predetermined to be, for example 18 degrees, which is far less than the interval of 90 degrees between the adjacent electric stability angles $\theta e$. The step angle $\Delta\theta e$ may be determined as 90/N with N being an integer greater than two.

At S104 following S103, it is checked based on the instruction signal inputted from the adjustment switch 60 whether the input of the adjustment instruction by the operation member 62 or 63 stopped. If the operation member 62 or 63 is still continuously operated (S104: NO), S103 is repeated. In each execution of S104, one micro-step driving of step angle $\Delta\theta e$ is performed for the period Ts. Thus, the display position of the virtual image 36 is continuously adjusted. If the adjustment instruction by the operation member 62 or 63 is stopped (S104: YES), S105 is executed. At S105 it is checked whether the present electric angle is at a target stabilization point $\theta et$. This target stabilization point $\theta et$ is set from among specific electric stabilization points $\theta es$ shown in FIG. 6. The specific electric stabilization point $\theta es$ is the electric stabilization point $\theta e$ (FIG. 7), at which the magnetic attraction force providing the holding torque is provided between the stabilization pole teeth 441a, 442a and the rotor magnet 43 when the drive signals are applied to each phase coils 443, 453. For example, the specific electric stabilization point $\theta es$ is zero point (0 degrees) of the electric stability point $\theta e$ and other electric angles, which are at every 180 degree interval from the zero point. For this reason, at S105, the target stabilization point $\theta et$ is set to the electric stability point $\theta es$, which is closest to the present electric angle in the direction of electric angle change made at immediately preceding step S103.

If the present electric angle does not equal the target stabilization point $\theta et$ yet (S105: NO), 5106 is executed in the similar manner as at 5103. That is, the micro-step driving is performed so that the electric angle is changed by one step angle $\Delta\theta e$ per the period Ts. Subsequently, S107 is executed to check whether the present electric angle equals the target stabilization point $\theta et$. If the present electric angle is not equal to the target stabilization point $\theta et$ yet (S107: NO), S106 is repeated to make the micro-step driving of the step angle $\Delta\theta e$ per period Ts. Thus, as the micro-step driving is performed as indicated as an energized or powered rotation mode MS shown in FIG. 10A, the display position of the virtual image 36 is continuously adjusted. If the present electric angle equals the target stabilization point $\theta et$ (S107: YES), S108 is executed. At S108, the driving signals for the phase coils 443 and 453 are stopped.

Figure 7:
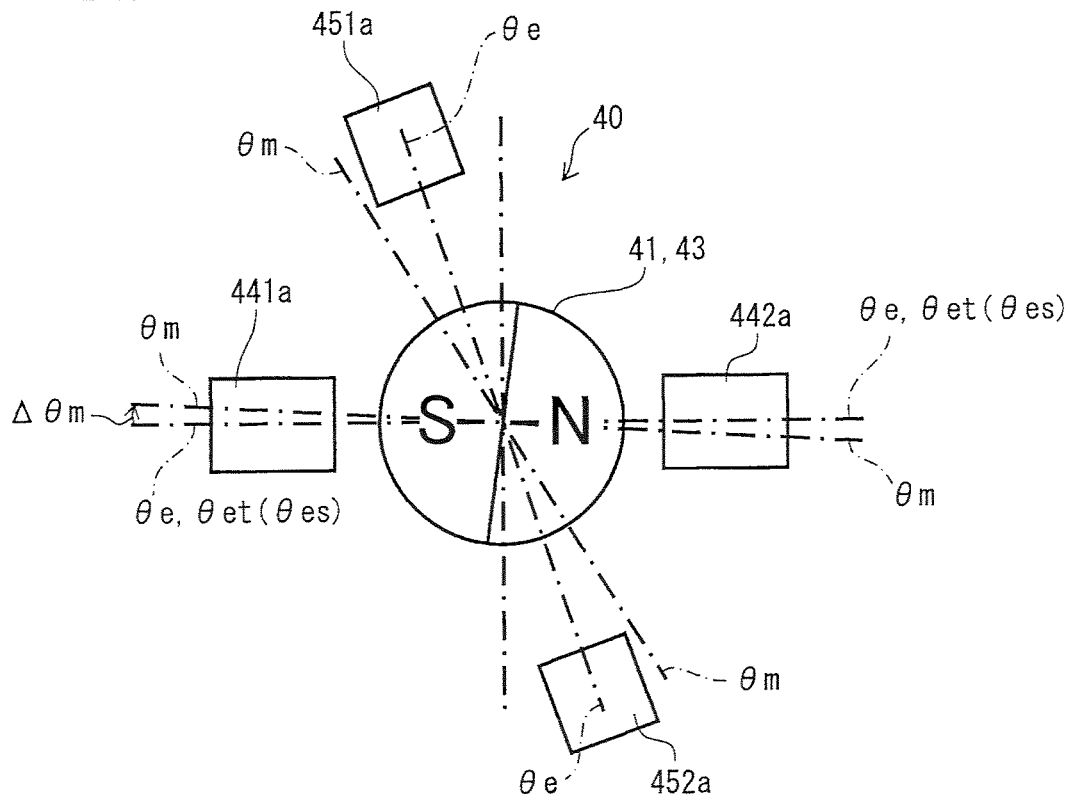
FIG. 7 is a schematic diagram of a characteristic and operation of the stepper motor shown in FIG. 1.

If the present electric angle is at a point, which is prior to the target stabilization point $\theta et$ by one step angle $\Delta\theta e$ (that is, at angle position $\theta b$ in FIG. 10A), when S105 is executed, the time interval from S106 of micro-step driving to S108 through S107 substantially equals the predetermined period Ts. That is, after the electric angle reaches a point, which is prior to the target stabilization point $\theta et$ by one step angle $\Delta\theta e$, the drive signal is continued to be applied for one more period Ts and then stopped at the target stabilization point $\theta et$. By thus stopping the application of the drive signal, the rotor 41 of the stepper motor 40 rotates by inertia in the inertia rotation mode toward the mechanical stabilization point $\theta m$, which is nearest to the stabilization pole teeth 441a, 442a from the target stabilization point $\theta et$ of the application stop time as shown in FIG. 7. The rotor 41 thus stops at or near the mechanical stabilization point $\theta m$.

Figure 10B:
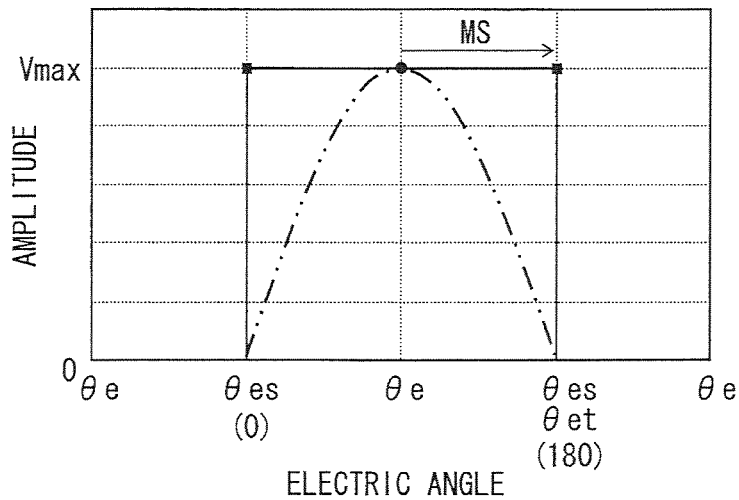

If the instruction signal indicating the manipulation of the operation member 62 or 63 continued for less than the threshold time period Tth (S102: NO), it is determined that the instruction of the upward adjustment or the downward adjustment indicates fine adjustment of the display position of the virtual image 36. In this case, S109 is executed following S102. At S109, the drive signal applied to the phase coil 443, 453 is controlled as shown in FIG. 10B so that the stepper motor 40 is driven to make a full step rotation. That is, the drive signal is changed 90 degrees, which is a full step angle of one full step in the upward or the downward direction, from the present electric angle, that is, the electric stabilization point $\theta e$, to the next electric stabilization point $\theta e$. As a result, the reflection mirror 32 is driven to rotate in correspondence to a change in the electric angle of the stepper motor 40 so that the display position of the virtual image 36 is finely adjusted in accordance with a short-time manipulation of the operation member 62 or 63.

As shown in FIG. 9, at S110 following S109, it is checked whether the present electric angle attained the target stabilization point $\theta et$. The target stabilization point $\theta et$ is set to one of the electric stabilization points $\theta es$, which is closest to the present electric angle in the direction of the electric angle change made by the immediately preceding S109 among the plural electric stability points $\theta es$ providing the magnetic attraction forces for the holding torque. This is similar to S105.

If the present electric angle does not reach the target stability point $\theta et$ (S110:NO), S109 is executed to perform the full step driving of 90 degrees by applying the drive signals to the phase coils 443 and 453 as indicated by the arrow MS. If the present electric angle reaches the target stabilization point $\theta et$, S108 is executed to stop the application of the drive signals to the 443 and 453. If it is determined at S105 that the present electric angle reached the target stability point $\theta et$, S108 is also executed to stop the application of the drive signals to the coils 443 and 453. Thus, when the application of the drive signals is stopped following S110 and S105, the rotor 41 of the stepper motor 40 makes the inertia rotation toward the mechanical stability point $\theta m$, which is nearest to the stability pole teeth 441a and 442a, and stops at or near the mechanical stability point $\theta m$. As shown in FIG. 9, after S108 for stopping the application of the drive signal, the drive signal control processing is repeated from S101 until the engine switch is turned off.

(Operation)

In the HUD device 1, when the input of the adjustment instruction produced by a long-time or short-time pushing manipulation is stopped, the control system 70 continues to apply the drive signal to the stepper motor 40 until the electric angle reaches the target stabilization point $\theta et$ among the electric stabilization points $\theta e$, at which the motor operation is stabilized electrically by the holding torque. The target stability point $\theta et$ is set based on the stabilization pole teeth 441a and 442a of the A-phase, the magnetic attraction force of which provided relative to the rotor magnet 43 of the rotor 41 to provide the detent torque when not powered is greater than that of the pole teeth of the B-phase. That is, the target stabilization point $\theta et$ is set to one of the electric stabilization points $\theta es$, at which the magnetic attraction force for providing the holding torque is generated between the stabilization pole teeth 441a, 442a and the rotor magnet 43 when powered. As a result, the phase difference between the mechanical stabilization point $\theta m$, at which the detent torque is provided by the large magnetic attraction force of the stabilization pole teeth 441a and 442a when not powered, is reduced relative to the target stabilization point $\theta et$, at which the holding torque is provided by the stabilization pole teeth 441*a* and 442*a* when powered. Even if the continued application of the drive signal is stopped after the target stabilization point θet is attained, an inertia rotation amount Δθm (shown in FIG. 7) of the rotor 41 toward the mechanical stabilization point θm, which is immediately preceding the stabilization pole teeth 441*a* and 442*a*, is reduced to be small. With respect to the display position of the virtual image 36 adjusted by driving the reflection mirror 32 to rotate by the stepper motor 40, the amount of deviation from the position corresponding to the target stabilization point θet is minimized. Thus, reliability of display of the virtual image of the vehicle information is improved.

In the HUD device 1, when the input of the adjustment instruction produced by the long-time or short-time pushing manipulation is stopped, the control system 70 stops applying the drive signal to the stepper motor 40 at the time the electric angle reaches the target stabilization point θet and the rotor 41 rotates by inertia. Thus the rotor 41 can be continuously rotated toward the mechanical stabilization point θm side without stopping at the target stabilization point θet. The inertia rotation amount Δθm between the target stabilization point θe and the mechanical stabilization point θm can be reduced to be small according to the above-described configuration and operation. The display position of the virtual image 36 can be continuously adjusted crossing the position corresponding the target stabilization point θet. Further the rotation amount from such a corresponding position can be reduced. The vehicle information can thus be displayed virtually with high reliability.

In the HUD device 1, the stators 44 and 45 form the magnetic circuits, for example, the magnetic circuits MC in case of non-energization time, with the magnetic parts 441, 442, 46 and the magnetic parts 451, 452, 46, and the air gaps 444 and 445, respectively. With those magnetic circuits, the stators 44 and 45 provide the magnetic attraction forces between the rotor magnet 43 and the pole teeth 441*a*, 442*a* and the pole teeth 451*a*, 452*a*, respectively. Since the number of air gaps 444 and 445 differ between the stators 44 and 45, the magnetic resistances of the respective magnetic circuits also differ. Hence the magnetic attraction forces, which are generated between the rotor magnet 43 and the pole teeth 441*a*, 442*a* and between the rotor magnet 43 and the pole teeth 451*a*, 452*a*, differ. As a result, it is ensured that the greater magnetic attraction force, which is generated relative to the rotor magnet 43 to provide the detent torque when not powered, is generated by the stabilization pole teeth 441*a*, 442*a* of the A-phase than by the stabilization pole teeth 451*a*, 452*a* of the B-phase. By the small phase difference provided by the stabilization pole teeth 441*a* and 442*a* between the target stabilization point θet and the mechanical stabilization point θm, the change amount in the display position of the virtual image 36 from the position corresponding to the target stabilization point θet can surely be reduced. The vehicle information can thus be displayed virtually with high reliability.

In the HUD device 1, the interval between the specific electric stabilization points θes, which are set as the target stabilization points θet is two times as large as that between any adjacent two of the electric stabilization points θe. The resolution power in the rotation direction of the motor shaft 42 is reduced to be one-half of the resolution power of the conventional device disclosed in JP 2011-207431A. It is however possible to set the change speed and the resolution power of the display position of the virtual image 36 to be generally equal to that of the conventional device by doubling the gear ratio of the gears 52 to 59 of the reduction gear mechanism 50.

(Other Embodiment)

The HUD device 1 is not limited to the above-described embodiment but may be implemented in many other embodiments.

For example, S102 to S107 may be omitted and the drive signal control processing may be performed without microstep driving. S102, S109 and S110 may be omitted and the drive signal control processing may be performed without the full step driving. The drive signal control processing may be modified such that S103 is executed following S102 by the short-time pushing manipulation and S109 is executed following S102 by the long-time pushing manipulation. At S108, the powered condition by the application of the drive signal may be maintained for a predetermined period before stopping the application of the drive signal. The stepper motor 40 may be other than the permanent magnet type, for example, a motor of a variable reluctance type or the like, as far as the motor has a difference in phase between the electric stabilization point θe determined by the holding torque and the mechanical stabilization point θm determined by the detent torque. The difference in the magnetic attraction forces between the stators of different phases may be generated by differentiating shapes of magnetic parts in the stators in place of differentiating the number of air gaps as exemplified in the above-described embodiment. In addition, the display unit 20 may be other than the liquid crystal panel. For example, it may be an EL (electroluminescence) panel or a unit, which provides a light emission image by indicators or the like. The projection target, to which the reflection image of the reflection mirror is projected, is not limited to the windshield. It may be a combiner or the like, which is provided exclusively in the HUD device.

What is claimed is:

1. A head-up display device for a vehicle comprising:
   a display unit for displaying a light-emitted image;
   an optical system including a reflection mirror, which is provided rotatably to reflect the light-emitted image and project a reflected image toward a projection target so that a virtual image of vehicle related information is displayed;
   a stepper motor for driving, when powered by a drive signal, the reflection mirror to rotate for adjusting a display position of the virtual image, the stepper motor having plural electric stabilization points, at which a motor operation is electrically stabilized by a holding torque generated when powered, and plural mechanical stabilization points, at which the motor operation is stabilized by a detent torque generated when not powered; and
   a control system for controlling the drive signal for the stepper motor in response to an adjustment instruction inputted from an external side,
   wherein the stepper motor has stators of plural phases, between which pole teeth are shifted in position in a motor rotation direction, and a rotor, which is rotated to a position in correspondence to magnetic attraction force generated relative to the pole teeth,
   wherein the pole teeth of a specified phase of the plural phases are set as stabilization pole teeth, the magnetic attraction force of which generated when not powered provides the detent torque greater than that of another phase of the plural phases,
   wherein the control system is configured to continue to apply the drive signal even after the adjustment instruction is stopped until an electric angle of the stepper motor reaches a target stabilization point, which is set to one of the electric stabilization points where the magnetic attraction force for providing the holding torque when powered is generated between the stabilization pole teeth and the rotor, and wherein the stators includes a first stator for a first phase and a second stator for a second phase, and the first stator has less air gaps than the second stator.

2. The head-up display device for a vehicle according to claim 1, wherein:

the control system is configured to continue application of the drive signal until the electric angle of the stepper motor reaches the target stabilization point and stop application of the drive signal when the electric angle of the stepper motor reaches the target stabilization point, in a case that an input of the adjustment instruction is stopped.

3. The head-up display device for a vehicle according to claim 1, wherein:

each of the stators of each of the plurality of phases is formed of a plurality of magnetic parts combined with the air gaps, and a number of air gaps is different among magnetic circuits of the plural phases, thereby to provide the magnetic attraction force between the pole teeth and the rotor.

4. The head-up display device for a vehicle according to claim 1, wherein the first stator of the first phase defines a first plurality of pole teeth and the second stator of the second phase different than the first phase defines a second plurality of pole teeth different than the first plurality of pole teeth.

5. The head-up display device for a vehicle according to claim 4, wherein the second plurality of pole teeth are offset from the first plurality of pole teeth in the motor rotation direction.

6. A head-up display device for a vehicle comprising:

a display unit for displaying a light-emitted image;

an optical system including a reflection mirror, which is provided rotatably to reflect the light-emitted image and project a reflected image toward a projection target so that a virtual image of vehicle related information is displayed;

a stepper motor for driving, when powered by a drive signal, the reflection mirror to rotate for adjusting a display position of the virtual image, the stepper motor having plural electric stabilization points, at which a motor operation is electrically stabilized by a holding torque generated when powered, and plural mechanical stabilization points, at which the motor operation is stabilized by a detent torque generated when not powered; and a control system for controlling the drive signal for the stepper motor in response to an adjustment instruction inputted from an external side, wherein the stepper motor has stators of plural phases, between which pole teeth are shifted in position in a motor rotation direction, and a rotor, which is rotated to a position in correspondence to magnetic attraction force generated relative to the pole teeth, wherein the pole teeth of a specified phase of the plural phases are set as stabilization pole teeth, the magnetic attraction force of which generated when not powered provides the detent torque greater than that of another phase of the plural phases, wherein the control system is configured to continue to apply the drive signal even after the adjustment instruction is stopped until an electric angle of the stepper motor reaches a target stabilization point, which is set to one of the electric stabilization points where the magnetic attraction force for providing the holding torque when powered is generated between the stabilization pole teeth and the rotor, wherein a first stator has a first phase and defines a first plurality of pole teeth, and a second stator has a second phase different than the first phase and defines a second plurality of pole teeth different than the first plurality of pole teeth, wherein the second plurality of pole teeth are offset from the first plurality of pole teeth in the motor rotation direction, and wherein the second plurality of pole teeth are offset from the first plurality of pole teeth by one-half of a pitch of the first plurality of pole teeth.

* * * * *